(12) United States Patent
Wenning

(10) Patent No.: US 6,491,986 B2
(45) Date of Patent: Dec. 10, 2002

(54) TRANSPARENT OR PIGMENTED POWDER COATING MATERIALS WITH CROSSLINKERS COMPRISING HYDROXYALKYLAMIDES AND POLYISOCYANATES CONTAINING URETDIONE GROUPS

(75) Inventor: Andreas Wenning, Nottuln (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 09/791,621

(22) Filed: Feb. 26, 2001

(65) Prior Publication Data

US 2001/0024696 A1 Sep. 27, 2001

(30) Foreign Application Priority Data

Feb. 25, 2000 (DE) .......................................... 100 08 927

(51) Int. Cl.$^7$ .................................................. B05D 1/22
(52) U.S. Cl. ....................... 427/461; 427/485; 427/486; 427/185; 427/195; 427/385.5; 427/388.2; 525/123; 525/124; 525/127; 525/131; 525/437; 525/440; 525/934
(58) Field of Search ................................. 525/123, 124, 525/127, 131, 440, 934; 427/461, 485, 486, 185, 195, 385.5, 388.2

(56) References Cited

U.S. PATENT DOCUMENTS

| 4,463,154 A | 7/1984 | Disteldorf et al. |
| 5,786,419 A | 7/1998 | Meier-Westhues et al. |
| 6,291,624 B1 * | 9/2001 | Ardaud ........................ 528/45 |

FOREIGN PATENT DOCUMENTS

| EP | 0 322 834 | 7/1989 |

* cited by examiner

Primary Examiner—Patricia A. Short
(74) Attorney, Agent, or Firm—Oblon, Spivak, McClelland, Maier & Neustadt, P.C.

(57) ABSTRACT

Transparent or pigmented powder coating materials with crosslinkers comprising hydroxyalkylamides and polyisocyanates containing uretdione groups.

18 Claims, No Drawings

TRANSPARENT OR PIGMENTED POWDER COATING MATERIALS WITH CROSSLINKERS COMPRISING HYDROXYALKYLAMIDES AND POLYISOCYANATES CONTAINING URETDIONE GROUPS

BACKGROUND OF THE INVENTION

1. Field of the Invention

The present invention relates to transparent or pigmented powder coating materials with crosslinkers comprising hydroxyalkylamides and polyisocyanates containing uretdione groups, which materials possess reduced susceptibility to pinholing.

2. Discussion of the Background

Powder coating materials based on triglycidyl isocyanurate (TGIC) and acid-functional polyesters produce corrosion-resistant and weather-stable powder coatings. EP 0 536 085 describes, however, how expensive processes or a relatively large and thus likewise expensive purification effort are required in order to prepare the TGIC in solid form. Moreover, TGIC is classified by the European Community as a category II mutagen, which is that it is regarded as a cause of mutations, and as of May 31, 1998 has required that it be labeled as "toxic".

Toxicologically unobjectionable and at the same time more reactive as well are β-hydroxyalkylamide crosslinkers. In U.S. Pat. Nos. 4,076,917 and 4,101,606, β-hydroxyalkylamides are combined with polymers having at least one carboxyl or anhydride function, in particular with polyacrylates, to form powder coating materials. U.S. Pat. No. 4,988,767 describes powder coating materials based on hydroxyalkylamides and acidic acrylate resins. EP 0 322 834 describes thermosetting powder coating materials composed of β-hydroxyalkylamides and polyesters containing acid groups. These coatings with β-hydroxyalkylamide crosslinker are highly weather-stable, very flexible, hard, and chemical-resistant. Especially at relatively high coat thicknesses, however, the water which is released on crosslinking leads to pinholing.

U.S. Pat. No. 4,889,890 describes hybrid powder coating materials. The acidic polymers they contain are cured with polyepoxides such as, for example, polyglycidyl ethers of aromatic phenols. In order to increase the crosslinking density, a β-hydroxyalkylamide is used. These hybrid powder coating materials afford good corrosion protection but are unsuited to use outdoors because of a lack of weathering stability.

Thometzek et al. in 5th Nuremberg Congress, Congress Papers, Volume 1, 251–273 (1999) describe powder coating materials comprising a hydroxy-functional polyester resin, a hydroxyalkylamide, and a bifunctional crosslinker which in addition to blocked isocyanate groups contains carboxyl groups. These powder coating materials are suitable for obtaining matte rather than glossy coatings.

SUMMARY OF THE INVENTION

Accordingly, one object of the present invention is to provide powder coating materials which give highly glossy, flexible, light-stable and weather-stable coatings of low susceptibility to pinholing.

Briefly, this object and other objects of the present invention as hereinafter will become more readily apparent can be attained by a transparent or pigmented powder coating material containing crosslinkers comprising hydroxyalkylamides and polyisocyanates containing uretdione groups, comprising:

a) from 20 to 99% by weight of at least one acidic polymer;
b) from 1 to 25% by weight of at least one β-hydroxyalkylamide;
c) from 0.05 to 10% by weight of at least one nonaromatic polyisocyanate which contains uretdione groups and has an NCO functionality $\geq 1$;
d) from 0 to 50% by weight of at least one pigment and/or inorganic filler;
e) from 0 to 5% by weight of at least one adjuvant or auxiliary.

DETAILED DESCRIPTION OF THE PREFERRED EMBODIMENTS

It has surprisingly been found that coatings comprising acidic polymers and β-hydroxyalkylamide crosslinkers, especially at relatively great coat thicknesses, are markedly less susceptible to pinholing if polyisocyanate crosslinkers containing uretdione groups are added as an additional component to the coating formulation. Flexibility, gloss, reactivity, and weather stability remain at the traditional high level of polyester/hydroxyalkylamide or polyurethane powder coating materials.

Suitable acidic polymers A) for the powder coating material of the present invention include polyester resins and acrylate resins.

The acidic polyesters possess a glass transition temperature (Tg) in the range from 30 to 85° C. and an acid number ranging from 20 to 80 mg KOH/g. These acidic polyesters are prepared primarily by a condensation reaction of aliphatic polyols and/or cycloaliphatic polyols with aliphatic and/or aromatic polycarboxylic acids and anhydrides. Polyesters of this kind are described, for example, in EP 0 322 807, DE 198 50 970 and WO 95/01406.

The acidic acrylate resins possess an acid number in the range from 10 to 250 mg KOH/g and a melting point of from 60 to 160° C. They are prepared primarily by copolymerizing a monomer mixture consisting of:

a) from 0 to 70 parts by weight of methyl (meth)acrylate,
b) from 0 to 60 parts by weight of (cyclo)alkyl esters of acrylic acid and/or methacrylic acid having 2 to 18 carbon atoms in the alkyl or cycloalkyl radical,
c) from 0 to 90 parts by weight of vinylaromatic compounds, and
d) from 0 to 60 parts by weight of olefinically unsaturated carboxylic acids, the sum of the parts by weight of components a) to d) being 100.

The monomers b) comprise (cyclo)alkyl esters of acrylic or methacrylic acid having 2 to 18 carbon atoms in the (cyclo)alkyl radical. Suitable examples of such ester monomers b) preferably include ethyl (meth)acrylate, n-propyl (meth)acrylate, isopropyl (meth)acrylate, n-butyl (meth)acrylate, isobutyl (meth)acrylate, tert-butyl (meth)acrylate, 2-ethylhexyl (meth)acrylate, cyclohexyl methacrylate, neopentyl methacrylate, isobornyl methacrylate, 3,3,5-trimethylcyclohexyl methacrylate, stearyl methacrylate and the like.

Suitable examples of monomers c) include styrene, vinyltoluene, ethylstyrene and the like. Suitable examples of unsaturated acid monomers d) include acrylic and methacrylic acid, which are also preferred acids, as well as crotonic acid, itaconic acid, fumaric acid, maleic acid, citraconic acid and the like.

The copolymers may be prepared by copolymerizing the exemplified monomers a) to d) in accordance with customary free-radical polymerization processes, such as solution, emulsion, bead or bulk polymerization, for example.

The monomers are copolymerized at temperatures ranging from 60 to 160° C., preferably from 80 to 150° C., in the presence of free-radical initiators and, if desired, molecular weight regulators.

The carboxyl-functional acrylate copolymers are prepared in inert solvents. Examples of suitable solvents include aromatic compounds, such as benzene, toluene, xylene; esters, such as ethyl acetate, butyl acetate, hexyl acetate, heptyl acetate, methylglycol acetate, ethylglycol acetate, methoxypropyl acetate; ethers, such as tetrahydrofuran, dioxane, diethylene glycol dimethyl ether; ketones, such as acetone, methyl ethyl ketone, methyl isobutyl ketone, methyl n-amyl ketone, methyl isoamyl ketone; or any desired mixtures of such solvents.

The copolymers may be prepared continuously or batchwise. A typical procedure is to meter the monomer mixture and the initiator into a polymerization reactor continuously and at a uniform rate and at the same time to continuously withdraw the corresponding amount of polymer. In this way it is possible, preferably, to prepare copolymers which are virtually uniform in chemical terms. Chemically near-uniform copolymers may also be prepared by running the reaction mixture at a constant rate into a stirred vessel without removing the polymer.

Alternatively, a portion of the monomers, by way of example, may be introduced as an initial charge in solvents of the stated type and then the remaining monomers and auxiliaries, separately or together, may be introduced into this initial charge at the reaction temperature. In general, the polymerization takes place under atmospheric pressure, but may also be conducted at pressures of up to 25 bar. The initiators are used in amounts ranging from 0.05 to 15% by weight, based on the overall amount of the monomers.

Suitable initiators include the usual free-radical initiators, such as aliphatic azo compounds, of which examples include azodiisobutyronitrile, azobis-2-methylvaleronitrile, 1,1'-azobis-1-cyclohexanenitrile and 2,2'-azobis-isobutyric acid alkyl esters; symmetrical diacyl peroxides, which include acetyl, propionyl and butyryl peroxide, benzoyl peroxides substituted by bromine, nitro, methyl or methoxy groups, and lauryl peroxides; symmetrical peroxydicarbonates, e.g., tert-butylperbenzoate; hydroperoxides, such as tert-butyl hydroperoxide and cumene hydroperoxide; dialkyl peroxides, such as dicumyl peroxide, tert-butyl cumyl peroxide and di-tertbutyl peroxide. In order to regulate the molecular weight of the copolymers it is possible to employ customary regulators in the preparation. Examples of such include mercaptopropionic acid, tert-dodecyl mercaptan, n-dodecyl mercaptan and diisopropylxanthogen disulfide. The regulators may be added in amounts ranging from 0.1 to 10% by weight, based on the overall amount of the monomers.

The copolymer solutions obtained after copolymerization can then be subjected, without further work-up, to evaporation or devolatilization, by which the solvent is removed. For example, the solution can be placed in a devolatilizing extruder or spray dryer at a temperature ranging from about 120 to 160° C. under a vacuum of from 100 to 300 mbar. The copolymer product is then recovered.

Polyacrylates of this kind are described, for example, in U.S. Pat. No. 4,988,767. As polycarboxyl compounds it is of course also possible to use mixtures of two or more substances.

The β-hydroxyalkylamides B) are known and are described, for example, in EP 0 957 082, U.S. Pat. No. 4,076,917 and U.S. Pat. No. 4,101,606. Suitable β-hydroxyalkylamides include those having the following structure:

Formula I

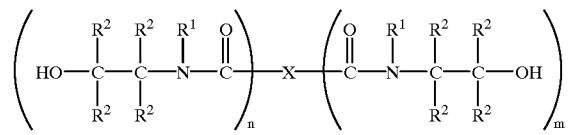

where:
X is a chemical bond, hydrogen or a monovalent or polyvalent organic group derived from saturated, unsaturated or aromatic hydrocarbon groups and having 1–24 carbon atoms, or these radicals substituted by heteroatoms;

$R^1$ is hydrogen, an alkyl, alkenyl, aryl or aralkyl radical having 1–24 carbon atoms, these radicals substituted by heteroatoms, or

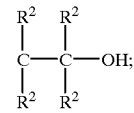

wherein each of $R^2$ independently is identical or different, and is a radical selected from hydrogen, an alkyl, aryl, aralkyl or alkenyl radical having 1–24 carbon atoms, or these radicals substituted by heteroatoms;

n is an integer from 1 to 10;

m is 0, 1 or 2; and $n+m \geq 2$.

Preferred compounds used to prepare the powder coating materials of the invention are prepared in accordance with the procedure disclosed in EP 0 957 082 as described on page 4 of the A2 text [0026].

The ratio of the carboxyl-containing polymers A) to the β-hydroxyalkylamide compound B) is generally selected such that the ratio of carboxyl groups to hydroxyl groups ranges from 0.6:1 to 1.6:1.

The nonaromatic polyisocyanates containing uretdione groups, C), and having an NCO functionality >1 are known. They are described, for example, in DE 30 30 539, 44 06 444, DE 195 47 878, DE 196 33 218 and EP0 639 598.

The polyisocyanate c) comprises uretdiones of aliphatic, (cyclo)aliphatic and cycloaliphatic diisocyanates. Preferred uretdiones are derived from the diisocyanates isophorone diisocyanate (IPDI), hexamethylene diisocyanate (HDI), 2-methylpentyl diisocyanate (MPDI) and 2,2,4(2,4,4)-trimethylhexamethylene diisocyanate (TMDI), which may be used alone or in mixtures. In general, the amount of component c) in the powder coating materials of the invention ranges from 0.05 to 10% by weight, preferably from 0.05 to 7% by weight.

Polyols suitable for chain extension are described, for example, in DE 19 57 483, DE 21 05 777, DE 25 42 191 and DE 27 38 270. Preferred polyols include ethylene glycol, 1,4-butanediol, 1,5-pentanediol, 1,6-hexanediol, 3-methyl-1,5-pentanediol, 2,2,4(2,4,4)-trimethylhexanediol, neopentyl glycol hydroxypivalate or trimethylolpropane. Linear or branched hydroxyl-containing polyesters or polycaprolactones may also be used as chain extenders.

The polyisocyanate C) may carry, terminally, either free or irreversibly blocked NCO groups or hydroxyl groups. The compounds that may be used in principle for irreversible blocking of the polyisocyanates include, for example, monohydric alcohols such as ethanol, n-butanol or 2-ethylhexanol and primary or secondary monoamines such as n-propylamine, n-butylamine, n-hexylamine, dibutylamine or dicyclohexylamine, for example.

The ratio of the β-hydroxyalkylamide compound b) to the nonaromatic polyisocyanate containing uretdione groups c), is generally selected such that the ratio of hydroxyl groups to isocyanate groups ranges from 0.5:1 to 2.0:1.

In order to prepare the ready-to-use powder coating materials, the acidic polymer a), the β-hydroxyalkylamide b), the nonaromatic polyisocyanate containing uretdione groups, c), together, if desired, with pigments or fillers d) such as $TiO_2$ or barium sulfate, for example, and further the usual powder coatings adjuvants or auxiliaries e) such as leveling agents such as polybutyl acrylate or degassing agents such as benzoin or catalysts such as dibutyltin dilaurate (DBTL) or $C_1$–$C_{18}$ zinc, aluminum or titanium carboxylate salts or aluminum oxides or zinc oxides, for example, are mixed. All ingredients of the powder coating material are homogenized in a melt. This can be done in a suitable apparatus, such as treatable compounders, for example, but preferably by extrusion, in the course of which the temperature ought not to exceed an upper limit of 140° C. After cooling to room temperature and appropriate comminution, the extruded mass is ground to a ready-to-spray powder. This powder may be applied to appropriate substrates by known processes, such as by means of electrostatic or tribostatic powder spraying or by fluidized bed sintering, with or without electrostatic assistance, for example.

Following powder application, the coated work pieces are cured by heating at a temperature ranging from 140 to 220° C. for from 60 to 5 minutes.

The prior art powder coating materials based on acidic polymers and β-hydroxyalkylamides have the disadvantage that they are susceptible to pinholing, especially at relatively high coat thicknesses.

Surprisingly, the minor addition of polyisocyanate crosslinkers containing uretdione groups results in improved coating resistance to this kind of surface defect. It is, therefore, possible to obtain greater process reliability when coating. At the same time, it is possible to utilize the known advantages of polyurethane crosslinking, such as excellent adhesion, flexibility, light stability and weather stability, for example.

Having now generally described this invention, a further understanding can be obtained by reference to certain specific Examples which are provided herein for purposes of illustration only and are not intended to be limiting unless otherwise specified.

EXAMPLES

1 Raw Materials Used 1.1 Acidic Polymer A)

The acidic polymer used was the polyester GRILESTA® P7617 (acid number 35 mg KOH/g, EMS-Inventa AG).

1.2 β-Hydroxyalkylamide B)

The β-hydroxyalkylamide B) used was the polyester VESTAGON® EP-HA 320 (OH number 668 mg KOH/g, Degussa-Huls AG).

1.3 Blocked Polyisocyanate C)

Polyisocyanates C) used were C1) VESTAGON® BF 1540 (polyisocyanate adduct containing uretdione groups, NCO number 15.9%, Degussa-Huls AG) and C2) VESTAGON® EP-BF 1310 (polyisocyanate adduct containing uretdione groups, NCO number 13.3%, Degussa-Huls AG).

2 Powder Coating Materials 2.1 General Preparation Procedure

The comminuted products, i.e., acidic polyester, β-hydroxyalkylamide compound, polyisocyanate containing uretdione groups, leveling agent, and catalysts if desired, are intimately mixed in an edge runner mill, together if appropriate with a white pigment, and the mixture is then homogenized in a twin-screw extruder (Berstorff equipment) up to a maximum of 140° C. After cooling, the extrudate is fractionated and ground with a pin mill to a particle size of <100 μm. The powder prepared in this manner is applied to degreased, optionally pretreated iron panels using an electrostatic powder spraying unit at 60 kV and the panels are baked in a convection oven at temperatures ranging from 140 to 220° C.

The abbreviations in the table below have the following significations:

CT=coat thickness in μm

EI=Erichsen indentation (DIN 53 156)

CH=crosshatch testing (DIN 53 151)

GG 60° angle=Gardner gloss measurement (ASTM-D 5233)

Imp. rev=impact reverse inch·lb 2.2 Performance Testing

TABLE 1

| Pigmented powder coating materials | | | |
|---|---|---|---|
| Example Formulation* | 1 | 2 | 3 Comparative |
| GRILESTA ® p 7617 | 60.32 | 60.33 | 60.5 |
| VESTAGON ® EP-HA 320 | 3.21 | 3.20 | 3.2 |
| VESTAGON ® BF 1540 | 0.17 | — | — |
| VESTAGON ® EP-BF 1310 | — | 0.17 | — |
| Notes: | 35% by weight $TiO_2$ (white pigment), 1.0% by weight Resiflow PV 88, 0.3% by weight benzoin | | |
| Film data | | | |
| CT | 75–80 | 58–72 | 61–69 |
| CH | 0 | 0 | 0 |
| GG 60° angle | 93 | 92 | 92 |
| EI | >10 | >10 | >10 |
| Imp. rev. | >160 | >160 | >160 |
| Note | no PH[2] | no PH[2] | C[1], many PH[2] |
| Curing: | L200° C./10 minutes | | |

[1]C = cratering, [2]PH = pinholes, *amounts in % by weight

The disclosure of German priority application Serial Number 10008927.5 filed Feb. 25, 2000 is hereby incorporated by reference into the present application.

Obviously, numerous modifications and variations of the present invention are possible in light of the above teachings. It is, therefore, to be understood that within the scope of the appended claims, the invention may be practiced otherwise than as specifically described herein.

What is claimed as new and is intended to be secured by Letters Patent is:

1. A transparent or pigmented powder coating material containing crosslinking agents comprising hydroxyalkylamides and polyisocyanates containing uretdione groups, comprising:

A) from 20 to 99% by weight of at least one acidic polymer;

B) from 1 to 25% by weight of at least one β-hydroxyalkylamide;

C) from 0.05 to 10% by weight of at least one nonaromatic polyisocyanate which contains uretdione groups and has an NCO functionality $\geq 1$;

D) from 0 to 50% by weight of at least one pigment and/or inorganic filler;

E) from 0 to 5% by weight of at least one adjuvant or auxiliary, wherein said acidic polymer A) is (1) at least one polyester resin having a glass transition temperature in the range from 30 to 85° C. and an acid number ranging from 20 to 80 mg KOH/g, or (2) at least one acrylate resin having an acid number in the range from 10 to 250 mg KOH/g and a melting point ranging from 60 to 160° C., or a mixture of (1) and (2), and wherein the nonaromatic polyisocyanate containing uretdione groups, C) comprises polyols as chain extenders.

2. The powder coating material as claimed in claim 1, wherein said acidic polymer A) is a desired mixture of the at least one polyester resin and the at least one acrylate resin.

3. The powder coating material as claimed in claim 1, wherein said β-hydroxyalkylamide B) has formula I:

Formula I

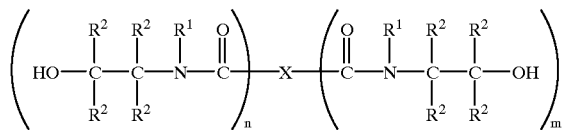

wherein:

X is a chemical bond, hydrogen or a monovalent or polyvalent organic group derived from saturated, unsaturated or aromatic hydrocarbon groups and having 1–24 carbon atoms, or these radicals substituted by heteroatoms;

$R^1$ is hydrogen, an alkyl, alkenyl, aryl or aralkyl radical having 1–24 carbon atoms, these radicals substituted by heteroatoms, or

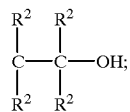

each of $R^2$ independently being identical or different radicals and selected from the group consisting of hydrogen, an alkyl, aryl, aralkyl or alkenyl radical having 1–24 carbon atoms, or these radicals substituted by heteroatoms;

n is an integer from 1 to 10;

m is an integer from 0, 1 or 2; and n+m$\geq$22.

4. The powder coating material as claimed in claim 1, wherein the nonaromatic polyisocyanate containing uretdione groups, C) is selected from uretdiones of aliphatic, (cyclo)aliphatic and/or cycloaliphatic diisocyanates.

5. The powder coating material as claimed in claim 4, wherein the nonaromatic polyisocyanate containing uretdione groups, C) is selected from the group consisting of uretdiones of the diisocyanates isophorone diisocyanate, hexamethylene diisocyanate, 2-methylpentyl diisocyanate, 2,2,4(2,4,4)-trimethylhexamethylene diisocyanate and mixtures thereof.

6. The powder coating material as claimed in claim 4, wherein the polyisocyanate C) carries, terminally, free or irreversibly blocked NCO groups or hydroxyl groups.

7. The powder coating material as claimed in claim 6, wherein the polyisocyanate C) carries said irreversibly blocked NCO groups obtained by a blocking agent which is a monohydric alcohol or a primary or secondary monoamine.

8. The powder coating material as claimed in claim 7, wherein the polyisocyanate is blocked irreversibly with ethanol, n-butanol, 2-ethylhexanol, n-propylamine, n-butylamine, n-hexylamine, dibutylamine or dicyclohexylamine.

9. The powder coating material as claimed in claim 1, wherein the chain extenders are ethylene glycol, 1,4-butanediol, 1,5-pentanediol, 1,6-hexanediol, 3-methyl-1,5-pentanediol, 2,2,4(2,4,4)-trimethylhexanediol, neopentyl glycol hydroxypivalate, trimethylolpropane, linear or branched, hydroxyl-containing polyesters, polycaprolactones or combinations thereof.

10. The powder coating material as claimed in claim 1, wherein said at least one auxiliary and adjuvant is a leveling agent, degassing agent or catalyst.

11. The powder coating material as claimed in claim 10, which further comprises a catalyst in a concentration ranging from 0.03 to 1.0% by weight, based on the total amount of powder coating material.

12. The powder coating material as claimed in claim 11, wherein said catalyst is selected from the group consisting of aluminum carboxylate salts, titanium carboxylate salts, aluminum oxides, zinc oxides, organotin compounds and combinations thereof.

13. The powder coating material as claimed in claim 1, wherein the ratio of the acidic polymer A) to the β-hydroxyalkylamide compound B) is selected such that the ratio of carboxyl groups to hydroxyl groups ranges from 0.6:1 to 1.6:1.

14. The powder coating material as claimed in claim 1, wherein the ratio of the β-hydroxyalkylamide compound B) to the nonaromatic polyisocyanate containing uretdione groups, C), is selected such that the ratio of hydroxyl groups to isocyanate groups ranges from 0.5:1 to 2.0:1.

15. A method of providing a substrate with a polymeric coating having excellent stability, comprising:

spray coating the powder coating material of claim 1 onto said substrate; and then curing the applied coating at a temperature of 140 to 220° C. over a time from 5 to 60 minutes.

16. The method according to claim 15, wherein said spraying technique is electrostatic or tribostatic powder spraying.

17. A method of providing a substrate with a polymeric coating having excellent stability, comprising:

coating by fluidized bed sintering the powder coating material of claim 1 onto said substrate; and then curing the applied coating at a temperature of 140 to 220° C. over a time from 5 to 60 minutes.

18. A method of preparing a powder coating material, comprising:

intimately mixing powdered materials of acidic polyester, β-hydroxyalkylamide, polyisocyanate containing uretdione groups and optionally leveling agent, pigment, catalyst, adjuvant or combinations thereof;

homogenizing the mixture in a device at a temperature of up to 140° C.;

cooling the homogenized product; and fractionating and grinding the homogenized product,
wherein said acidic polymer A) is (1) at least one polyester resin having a glass transition temperature in the range from 30 to 85° C. and an acid number ranging from 20 to 80 mg KOH/g, or (2) at least one acrylate resin having an acid number in the range from 10 to 250 mg KOH/g and a melting point ranging from 60 to 160° C., or a mixture of (1) and (2), and wherein the nonaromatic polyisocyanate containing uretdione groups, C) comprises polyols as chain extenders.

* * * * *